United States Patent
Xia et al.

(10) Patent No.: US 12,420,486 B2
(45) Date of Patent: Sep. 23, 2025

(54) MULTI-SCALE SYSTEM FOR PROJECTION MICRO STEREOLITHOGRAPHY

(71) Applicant: BMF Material Technology Inc., Shenzhen (CN)

(72) Inventors: Chunguang Xia, San Diego, CA (US); Jiawen Xu, Shenzhen (CN)

(73) Assignee: BMF Material Technology Inc., Shenzhen (CN)

( * ) Notice: Subject to any disclaimer, the term of this patent is extended or adjusted under 35 U.S.C. 154(b) by 102 days.

(21) Appl. No.: 18/033,405

(22) PCT Filed: Oct. 21, 2021

(86) PCT No.: PCT/IB2021/059731
§ 371 (c)(1),
(2) Date: Apr. 24, 2023

(87) PCT Pub. No.: WO2022/084921
PCT Pub. Date: Apr. 28, 2022

(65) Prior Publication Data
US 2023/0398739 A1 Dec. 14, 2023

Related U.S. Application Data

(60) Provisional application No. 63/104,867, filed on Oct. 23, 2020.

(51) Int. Cl.
*B29C 64/277* (2017.01)
*B29C 64/124* (2017.01)
(Continued)

(52) U.S. Cl.
CPC .......... *B29C 64/277* (2017.08); *B29C 64/124* (2017.08); *B29C 64/393* (2017.08);
(Continued)

(58) Field of Classification Search
CPC ... B29C 64/277; B29C 64/124; B29C 64/393; B33Y 10/00; B33Y 30/00; B33Y 50/02
See application file for complete search history.

(56) References Cited

U.S. PATENT DOCUMENTS

| 4,575,330 A | 3/1986 | Hull |
| 5,192,559 A | 3/1993 | Hull et al. |

(Continued)

FOREIGN PATENT DOCUMENTS

| CN | 102928910 A | 2/2013 |
| CN | 105390056 | 3/2016 |

(Continued)

OTHER PUBLICATIONS

International Search Report and Written Opinion for PCT Patent Application No. PCT/IB2021/059731 dated Feb. 28, 2022.
(Continued)

*Primary Examiner* — Mathieu D Vargot
(74) *Attorney, Agent, or Firm* — Young Basile Hanlon & MacFarlane, P.C.

(57) ABSTRACT

Fast 3D printing with high resolution is made possible by projecting light and an image from optical light engine comprises a micro display chip and a light source, through a projection lens of a multi-projection lens system onto printing material, e.g., a curable resin, wherein the multi-projection lens system comprises two or more projection lenses each with different imaging ratios wherein the image and light are projected through only one projection lens of the multi-projection lens system at a time.

18 Claims, 5 Drawing Sheets

A schematic drawing of a multi-scale projection micro sterolithography system.

(51) Int. Cl.
  *B29C 64/393*  (2017.01)
  *B33Y 10/00*  (2015.01)
  *B33Y 30/00*  (2015.01)
  *B33Y 50/02*  (2015.01)

(52) U.S. Cl.
  CPC .............. *B33Y 10/00* (2014.12); *B33Y 30/00* (2014.12); *B33Y 50/02* (2014.12)

(56) References Cited

U.S. PATENT DOCUMENTS

| | | |
|---|---|---|
| 5,933,278 A | 8/1999 | Plummer et al. |
| 6,011,577 A | 1/2000 | Goodman et al. |
| 6,607,689 B1 | 8/2003 | Farnworth |
| 7,892,474 B2 | 2/2011 | Shkolnik et al. |
| 8,487,822 B1 | 7/2013 | Jennings |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,360,757 B2 | 6/2016 | DeSimone et al. |
| 9,496,675 B1 | 11/2016 | Plummer et al. |
| 11,654,617 B2 * | 5/2023 | Xia ................. B29C 64/286 264/401 |
| 11,654,619 B2 | 5/2023 | Xia |
| 2005/0219400 A1 | 10/2005 | Poulsen |
| 2005/0248061 A1 | 11/2005 | Shkolnik et al. |
| 2008/0174050 A1 | 7/2008 | Kikuchi |
| 2009/0186306 A1 | 7/2009 | Haraldsson |
| 2009/0196946 A1 | 8/2009 | Kihara et al. |
| 2010/0291401 A1 | 11/2010 | Medina et al. |
| 2011/0101569 A1 | 5/2011 | Yasukochi |
| 2011/0260365 A1 | 10/2011 | El-Siblani |
| 2011/0285060 A1 | 11/2011 | Yamamoto et al. |
| 2013/0021217 A1 | 1/2013 | Tsai et al. |
| 2013/0295212 A1 | 11/2013 | Chen et al. |
| 2015/0001763 A1 | 1/2015 | Elsey |
| 2015/0247679 A1 | 9/2015 | Niimi et al. |
| 2017/0274586 A1 | 9/2017 | Hakkaku et al. |
| 2017/0334142 A1 | 11/2017 | Baldeck et al. |
| 2017/0355132 A1 | 12/2017 | Moore |
| 2018/0056587 A1 | 3/2018 | Arai et al. |
| 2018/0056590 A1 | 3/2018 | Costabeber |
| 2018/0194064 A1 | 7/2018 | Chen et al. |
| 2018/0200964 A1 | 7/2018 | Rockstroh et al. |
| 2019/0022947 A1 | 1/2019 | Ho et al. |
| 2019/0111622 A1 | 4/2019 | Khalip |
| 2020/0061917 A1 | 2/2020 | Osborn et al. |
| 2020/0063093 A1 | 2/2020 | Matheu et al. |
| 2020/0101665 A1 | 4/2020 | Beets et al. |
| 2020/0108465 A1 | 4/2020 | Sweetland |
| 2021/0237345 A1 | 8/2021 | Xia et al. |
| 2021/0276249 A1 * | 9/2021 | Xia ................. B29C 64/129 |
| 2021/0331380 A1 | 10/2021 | Seo et al. |
| 2022/0048254 A1 | 2/2022 | Xia |
| 2023/0045800 A1 | 2/2023 | Xia |
| 2024/0157642 A1 | 5/2024 | Korten et al. |
| 2024/0198587 A1 | 6/2024 | Xia |

FOREIGN PATENT DOCUMENTS

| | | |
|---|---|---|
| CN | 104827667 B | 5/2017 |
| CN | 104991353 B | 6/2017 |
| CN | 206718470 U | 12/2017 |
| CN | 107756814 A | 3/2018 |
| CN | 108437448 A | 8/2018 |
| CN | 109466061 A | 3/2019 |
| CN | 109483872 A | 3/2019 |
| CN | 111 873 433 A | 11/2020 |
| CN | 111873431 A | 11/2020 |
| CN | 112549537 A | 3/2021 |
| CN | 113927897 A | 1/2022 |
| EP | 1 732 746 B1 | 4/2011 |
| EP | 3107703 B1 | 4/2020 |
| EP | 4232262 A1 | 8/2023 |
| EP | 3894184 B1 | 1/2024 |
| EP | 4326529 A1 | 2/2024 |
| EP | 4384379 A1 | 6/2024 |
| JP | H07329188 A | 12/1995 |
| JP | 2004314406 A | 11/2004 |
| JP | 2005219400 A | 8/2005 |
| JP | 2009083240 A | 4/2009 |
| TW | I568571 B | 2/2017 |
| WO | 2008069564 A1 | 6/2008 |
| WO | 2009042671 A1 | 4/2009 |
| WO | 2012051598 A2 | 4/2012 |
| WO | 2014042486 A1 | 3/2014 |
| WO | 2016115095 A1 | 7/2016 |
| WO | 2017157851 A1 | 9/2017 |
| WO | 2019014098 A1 | 1/2019 |
| WO | 2020181620 A1 | 9/2020 |
| WO | 2021056720 A1 | 4/2021 |
| WO | 2021103502 A1 | 6/2021 |
| WO | 2021165878 A1 | 8/2021 |

OTHER PUBLICATIONS

Ikuta et al., "Real three dimensional micro fabrication using stereo lithography and metal molding," Proceedings of MEMS '93, 6th IEEE Workshop on Micro Electro Mechanical Systems, San Diego, CA, Jan. 25-28, 1993, pp. 42-47.

Maruo et al., "Three-dimensional microfabrication by use of single-photon-absorbed polymerization," Applied Physics Letters 76(19):2656-2658, 2000.

Maruo et al., "Two-photon-absorbed near-infrared photopolymerization for three-dimensional microfabrication," Journal of Microelectromechanical Systems 7(4):411-415, 1998.

Kawata et al., "Finer features for functional microdevices—micromachines can be created with higher resolution using two-photon absorption" Nature 412(6848):697-698, 2001.

Bertsch et al., "Microstereolithography using liquid crystal display as dynamic mask-generator," Microsystem Technologies, 3(2):42-47, 1997.

Beluze et al., "Microstereolithography: A New Process to Build Complex 3D Objections, Symposium on Design, Test and Microfabrication of MEMs/MOEMs," Proceedings of SPIE 3680(2):808-817, 1999.

Panasonic ("Micro Laser Distance Sensor," in public at least in Apr. 2014, available at https://www.farnell.com/datasheets/1863584.pdf). (Year: 2014).

International Search Report and Written Opinion for PCT Patent Application No. PCT/IB2022/053395 dated Jun. 27, 2022, 12 pages.

Amaud Bertsch, Sebastien Jiguet, Paul Bernhard and Philippe Renaud, "Microstereolithography: a Review," Materials research society symposium proceedings, vol. 758, 2003, p. 3-15.

B. J. Lei, et al., "A wideband, pressure-driven, liquid-tunable frequency selective surface," IEEE Microwave Wireless Components Letters, vol. 21, No. 9, pp. 465-467, 2011.

Han et al., "Rapid multi-material 3D printing with projection micro-stereolithography using dynamic fluidic control," Additive Manufacturing 27(11 ):606-615, 2019.

Jingi Wang et al., "Liquid metal-based plasmonics" Optics Express, vol. 20, No. 2, p. 2346-2353, Jan. 2012.

Kowsari, et al., "High-efficiency high-resolution multimaterial fabrication for digital light processing-based three-dimensional printing," 3D Printing and Additive Manufacturing 5(3):185-193, 2018.

S. Maruo and K. Ikuta, "Movable microstructures made by two-photon three-dimensional microfabrication," in Proceedings of 1999 International Symposium on Micromechatronics and Human Science, 1999, pp. 173-178.

S. Maruo, 0. Nakamura and S. Kawata, "Three-dimensional microfabrication with two-photon-absorbed photopolymerization," Optics Letters, vol. 22, pp. 132, 1997.

T. Takagi and N. Nakajima, "Photoforming Applied to Fine Machining," 4th International Symposium on Micro Machine and Human Science, 1993.

(56) References Cited

OTHER PUBLICATIONS

International Search Report and Written Opinion for PCT Patent Application No. PCT/IB2021/059731 dated Feb. 28, 2022, 22 pages.
International Search Report and Written Opinion for PCT Patent Application No. PCT/IB2022/057569 dated Nov. 8, 2022, 16 pages.
Non-Final Office Action for U.S. Appl. No. 17/887,337 dated Sep. 16, 2024.
Notice of Allowance dated Jan. 31, 2025 for U.S. Appl. No. 17/312,173.

* cited by examiner

A schematic drawing of a multi-scale projection micro sterolithography system.

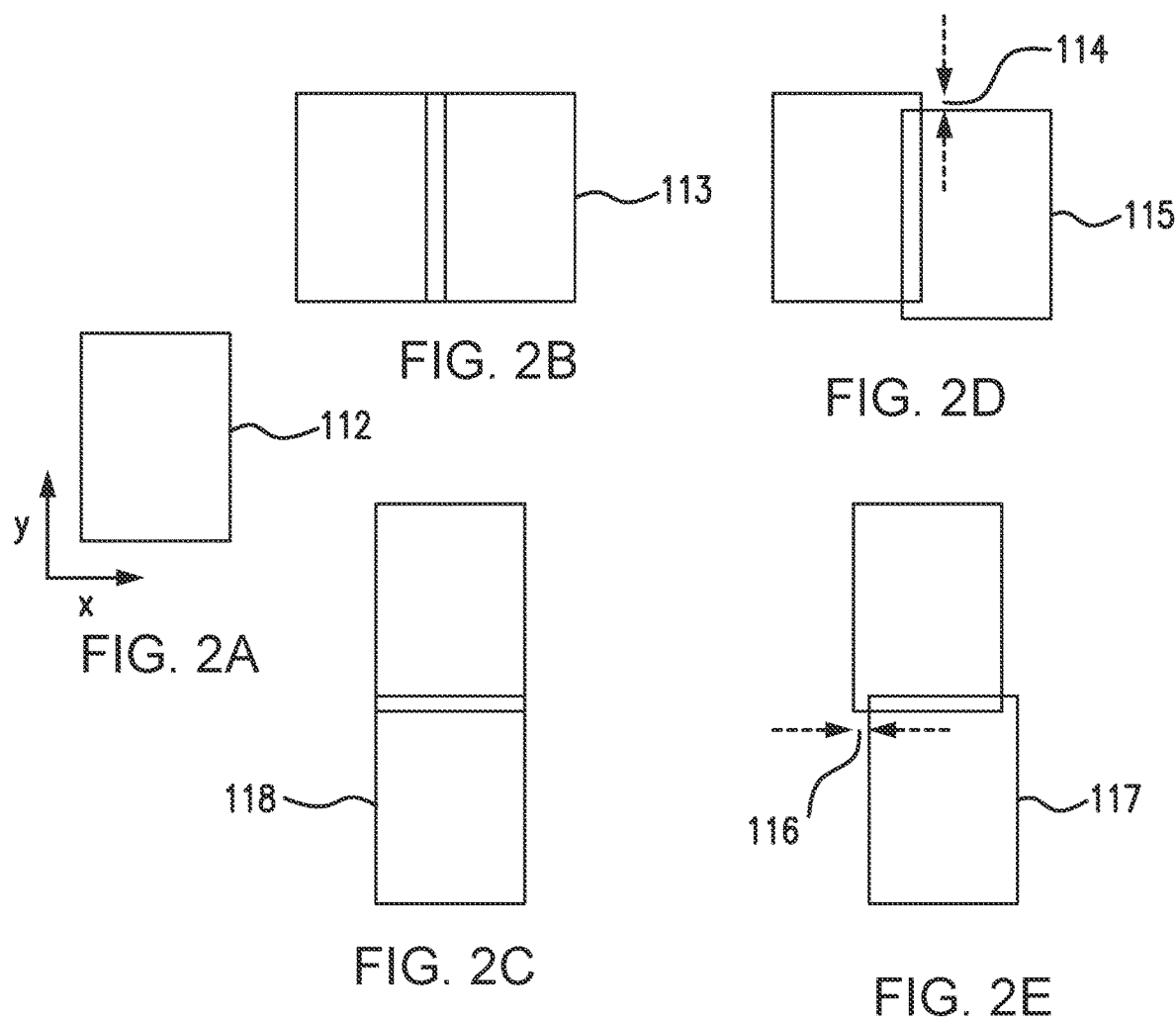

120

121

122

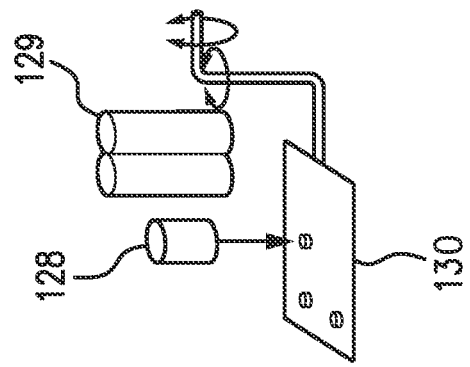
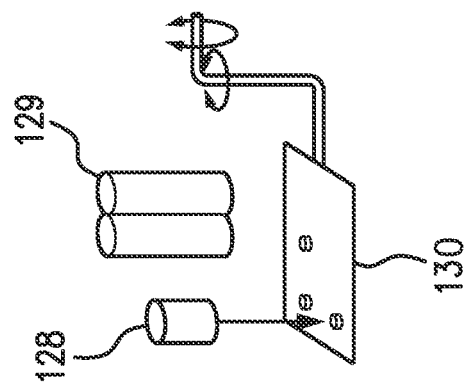
FIG. 5
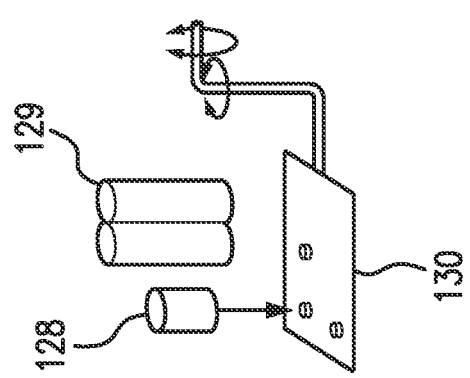

MULTI-SCALE SYSTEM FOR PROJECTION MICRO STEREOLITHOGRAPHY

FIELD OF THE INVENTION

The present invention provides an improved method for faster printing over a larger area with multiple projection lenses without sacrificing the resolution available from existing micro-stereolithography 3D printing methods. For example, some embodiments combine a dual-projection lens system of 2 μm and 10 μm pixels with optical shutter control, which quickly switches the image projection between individual lenses of the dual-projection lens system during large-area printing. The method of the invention disclosed herein is not limited to a 3D printing system of layer coating by membrane; it is also valid for any other type of method using free surface coating, spray coating, or hard window coating.

BACKGROUND

Stereolithography was originally conceived as a rapid prototyping technology. Rapid prototyping refers to a family of technologies that are used to create true-scale models of production components directly from computer aided design (CAD) in a rapid (faster than before) manner. Since its disclosure in U.S. Pat. No. 4,575,330, stereolithography has greatly aided engineers in visualizing complex three-dimensional part geometries, detecting errors in prototype schematics, testing critical components, and verifying theoretical designs at relatively low costs and in a faster time frame than before.

During the past decades, continuous investments in the field of micro-electro-mechanical systems (MEMS) have led to the emergence of micro-stereolithography (μSL), which inherits basic principles from traditional stereolithography but with much higher spatial resolution e.g., K. Ikuta and K. Hirowatari, "Real three dimensional micro fabrication using stereo lithography and metal molding," 6th IEEE Workshop on Micro Electrical Mechanical Systems, 1993. Aided by single-photon polymerization and two-photon polymerization techniques, the resolution of μSL was further enhanced to be less than 200 nm, e.g., S. Maruo and K. Ikuta, "Three-dimensional microfabrication by use of single-photon-absorbed polymerization," Appl. Phys. Lett., vol. 76, 2000; S. Maruo and S. Kawata, "Two-Photon-Absorbed Near-Infrared Photopolymerization for Three-dimensional Microfabrication," J. MEMS, vol. 7, pp. 411, 1998; S. Kawata, H. B. Sun, T. Tanaka and K. Takada, "Finer features for functional microdevices," Nature, vol. 412, pp. 697, 2001.

The speed was dramatically increased with the invention of projection micro-stereolithography (PμSL), Bertsch et al., "Microstereophotolithography using a liquid crystal display as dynamic mask-generator," Microsystem Technologies, p 42-47, 1997; Beluze et al., "Microstereolithography: a new process to build complex 3D objects," Symposium on Design, Test and microfabrication of MEMs/MOEMs, Proceedings of SPIE, v3680, n2, p 808-817, 1999. The core of this technology is a high resolution spatial light modulator, which is either a liquid crystal display (LCD) panel or a digital light processing (DLP) panel, each of which are available from micro-display industries.

While PμSL technology has been successful in delivering fast fabrication speeds with good resolution, further improvements are still wanted.

Due to the limitation of the physical size of the micro display chip, high resolution and large-area printing are conflicting requirements. In high-resolution printing, as the pixel size shrinks, the size of the projected image proportionally scales down, thereby significantly reducing the printing speed.

In this invention, a new method combines a dual-projection lens of distinct pixel size with a precision translation stage system to print faster than before over an area of approximately 10 cm×10 cm.

In most 3D printing technologies, accuracy and efficiency in dimension replication is very important. Therefore, in the Multi-scale Projection Micro Stereolithography (FIG. 1), it is very important to have high accuracy and efficiency in dimension control of layers, so that the actual CAD model can be duplicated in a practical period of time.

SUMMARY OF THE INVENTION

The method of the present invention provides more precise control, with greater speed and accuracy in a larger printing area, for example, 10 cm×10 cm printing area with a 2 μm optical resolution, than previously possible. In one broad embodiment, the present method uses a dual- or multi-projection lens system (also referred to herein as a dual- or multi-projection lens complex, or simply a dual- or multi-projection lens) dual-proj, combined with a precision translation stage system. The method not only maintains the dimensional accuracy of samples printed using, e.g., PμSL systems, but also significantly improves the printing speed by combining projection lenses with different imaging ratios for areas with different feature details.

The dual-projection lens comprises a higher resolution lens and a lower resolution lens, for example, lenses having image pixel size of 2 μm and 10 μm. The image from the micro display chip is delivered to both lenses of a dual-projection lens using a beam splitter and a mirror. But each time, only one lens projects the current image at the selected pixel size by controlling the optical shutters in front of the dual lens.

For example, many embodiments make use of a system comprising: i) an optical light engine, for example, a DLP or LCD with a light source for projection micro stereolithography, ii) a high precision camera to monitor the printing interface, iii) three precision stages to control the motion of the substrate for supporting the printing sample or the printing projection system in the X, Y, and Z directions, iv) a resin vat under the membrane where the parts are printed, and v) a laser displacement sensor for monitoring the membrane position and the printing substrate position to ensure one micron accuracy. The system is arranged relative to a surface of a substrate, i.e., a sample holder or sample, so that the lens is situated between the surface of the substrate and the light engine and it is gravitationally above the substrate.

In one embodiment, with the aid of the XY stages, and in a configuration for multi-scale PμSL, this invention provides three printing modes. When only a single sample is needed, which is smaller than the single exposure size, it is called single exposure mode. If multiple samples are needed, the XY stages will move stepwise and print the same sample in an array, which is called array exposure mode. As the sample size increases to exceed the size of the single exposure, the system will further divide one layer into multiple sections and stitch the adjacent sections into a whole layer by overlapping approximately 5 μm to 30 μm on the shared edges. This is the stitching exposure mode. It is also possible to combine stitching mode with array mode. In each layer, no matter its size, the image is analyzed and small features (gaps, holes, steps, sharps, etc.) are detected. A rectangular window equal to the size of the 2 μm resolution exposure is used to cover those tiny features. More windows can be added to cover all such small features. The rest of the areas will be covered by 10 μm resolution exposures. The stitching happens not only among section images of same resolution, but also among section images of different resolutions.

In another embodiment of the invention, the least square fitting error curves based on the measured data from actual samples will be fed into the translation of the XY stages to compensate the mechanical tolerances to ensure the accuracy of the stitching-printed sample is within specifications.

In various embodiments of the present invention, the substrate holding the sample is translated in the XY plane for stitching and array printing, with optics (e.g., DLP or /LCD panel and lens) fixed, however, translating the optics, or translating both the substrate and optics, may achieve the same result.

BRIEF DESCRIPTION OF THE DRAWINGS

FIGS. 2A-2E illustrate stitching errors in x and y direction during the stitch printing in a multi-scale micro stereolithography system.

FIG. 5 shows the procedures of leveling a sample stage using a laser displacement sensor in a multi-scale micro stereolithography system.

DETAILED DESCRIPTION OF THE INVENTION

Figure 1:
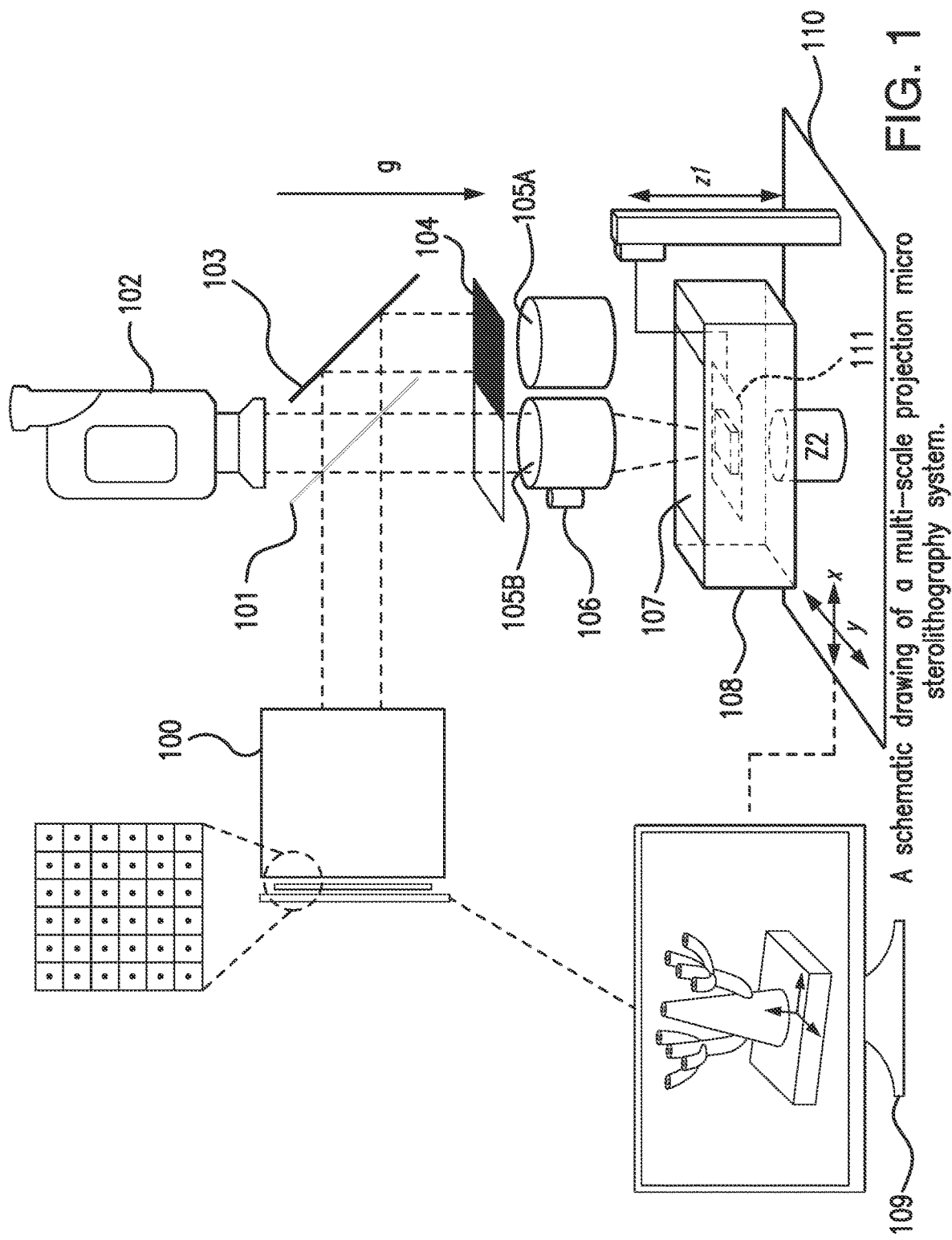
FIG. 1 is a schematic drawing of an embodiment of the multi-scale micro stereolithography system.

In one embodiment of the invention, the method is aided by a dual-projection lens 105A, 105B as shown in FIG. 1, as part of the light engine/dual-projection lens/membrane/displacement system discussed above. The dual-projection lens 105A, 105B provides precision printing based on the local details of the printing part. It dramatically increases the precision printing time without sacrificing the resolution for very fine details by locally adapting the resolution as needed.

For the PμSL case, the printing process starts with generating a 3D model in a computer and then slicing the digital model into a sequence of images, wherein each image represents a layer (e.g., 5 to 20 micrometers) of the model. A control computer 109 sends an image to a micro display chip 100 (e.g., DLP or LCD), and the image is projected, with the aid of a mirror 103, through a dual-projection lens 105A, 105B, in cooperation with a shutter 104, through a window 107 onto the bottom surface (the wet surface) of a membrane 111 within a vat 108 of resin. In some embodiments, a laser displacement sensor 106 may be integrated with the dual-projection lens 105A, 105B. In some embodiments, a high-precision camera or a charge-coupled device (CCD) 102 may be aligned with an optical axis of the lens 105A, 105B to monitor projection of the optical image. The CCD 102 may be positioned on a side of a beam splitter 101 opposite the shutter 104. The bright areas of the projected image are polymerized whereas the dark areas remain liquid. As one layer is finished, a Z stage of the precision stage assembly 110 moves the sample substrate down about 2-3 mm to peel off the membrane 111 from the sample. As soon as the membrane 111 is separated from the sample, the sample again moves up to a flat-membrane position less the thickness of next layer During this movement different techniques are applied to flatten the membrane 111 and defining the next layer of printing material, typically a resin, such as a photo curable resin. The above procedures are repeated for the number of the layers until the whole model is replicated in the vat 108.

Due to the size limit of either LCD or DLP chip, for example a DLP chip with 1920×1080 pixels at 10 μm printing optical resolution, a single exposure will only cover area of 19.2 mm×10.8 mm. Therefore, if the cross-section of a sample is larger than 19.2 mm×10.8 mm, it cannot be printed with single exposure method. As disclosed herein, a multiple-exposure stitching printing method is provided. By this method, an image representing a layer of the 3D model is further divided into multiple smaller sub-images with each image no larger than the DLP pixel resolution. For instance, an image of pixel resolution of 3800×2000 can be divided into four 1900×1000 sub-images with each one representing a quarter of this layer. As a result, a full layer of the model will be printed section by section based on the sub-images. To improve the mechanical strength of the shared edges of the adjacent sections, there is typically about a 5-30 μm overlap on the edges. The precise position and the amount of overlap are accurately controlled by the XY stage of the precision stage assembly 110. There are two coordinate systems: one is aligned with the micro display chip (e.g., DLP/LCD panel), the other one with the XY stage of the precision stage assembly 110. When these two coordinate systems are not parallel, for example due to some assembly tolerance, there will be offset errors on the shared edges of adjacent sections. FIG. 2A shows a size of a single first exposure 112; FIG. 2B shows a the result of precise alignment of a second exposure 113 in an X direction; FIG. 2C shows a result of a second exposure 115 with an error offset 114 in the Y direction; FIG. 2C shows a result of precise alignment of a second exposure 118 in a Y direction; FIG. 2E shows a result of a second exposure 117 with an error offset 116 in the X direction. In precision printing, where error requirements may be less than μm, stage assembly tolerance is usually outside the allowed range and the offset is not linear to the stage travel distance. Therefore, in some embodiments, offsets are measured at 10 or more evenly distributed points in both X and Y directions on a full-range printed square sample. At least second order polynomial error curves on both X and Y directions may be fitted to the measure data by the least square method, as shown below.

$$X\text{Error}(X_0, Y_0) = C_1 + C_2 + C_3 Y_0 + C_4 X_0 Y_0 + C_5 X_0^2 + C_6 Y_0^2$$

$$Y\text{Error}(X_0, Y_0) = D_1 + D_2 + D_3 Y_0 + D_4 X_0 Y_0 + D_5 X_0^2 + D_6 Y_0^2$$

In the above polynomials, the Cs and Ds are polynomial coefficients calculated by the least square fitting method. The error curves of the two polynomials will be fed into the translation of the XY stages to compensate the offset to ensure accuracy of the stitching-printed sample is within specifications. For example, if the theoretical target is ($X_0$, $Y_0$), then the actual executed translation commands may be ($X_0 + X\text{Error}(X_0, Y_0), Y_0 + Y\text{Error}(X_0, Y_0)$).

Figure 3A:
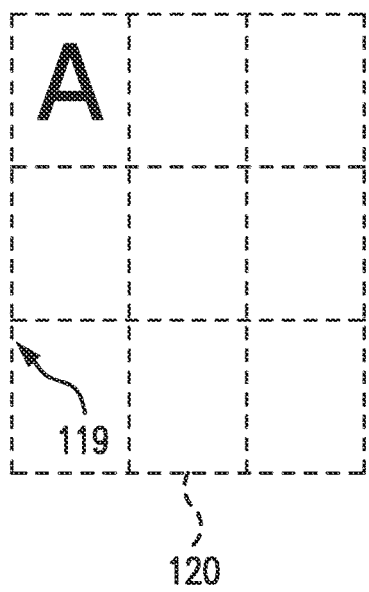
FIGS. 3A-3C show three printing modes in a multi-scale micro stereolithography system.
Figure 3B:
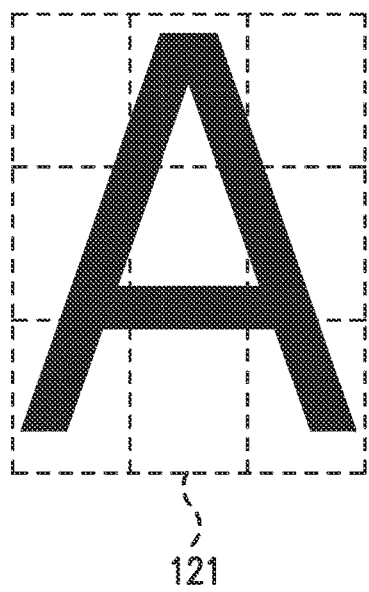
Figure 3C:
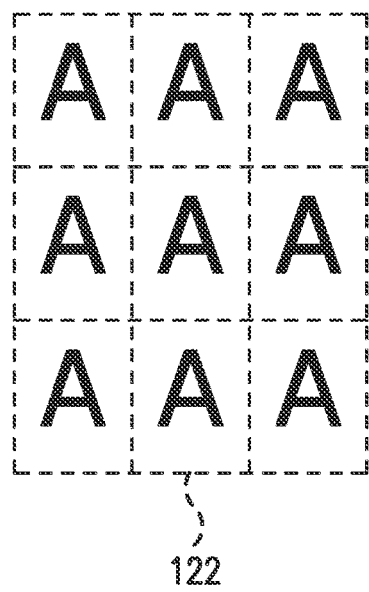

With the aid of the XY stages, the multi-scale PμSL provides basically three printing modes (FIGS. 3A-3C). When printing a single sample, which is smaller than the single exposure size of the finest lens, 2 μm in some embodiments, the XY stages will not move during printing. It is called single exposure mode, which is shown in FIG.

Figure 4:
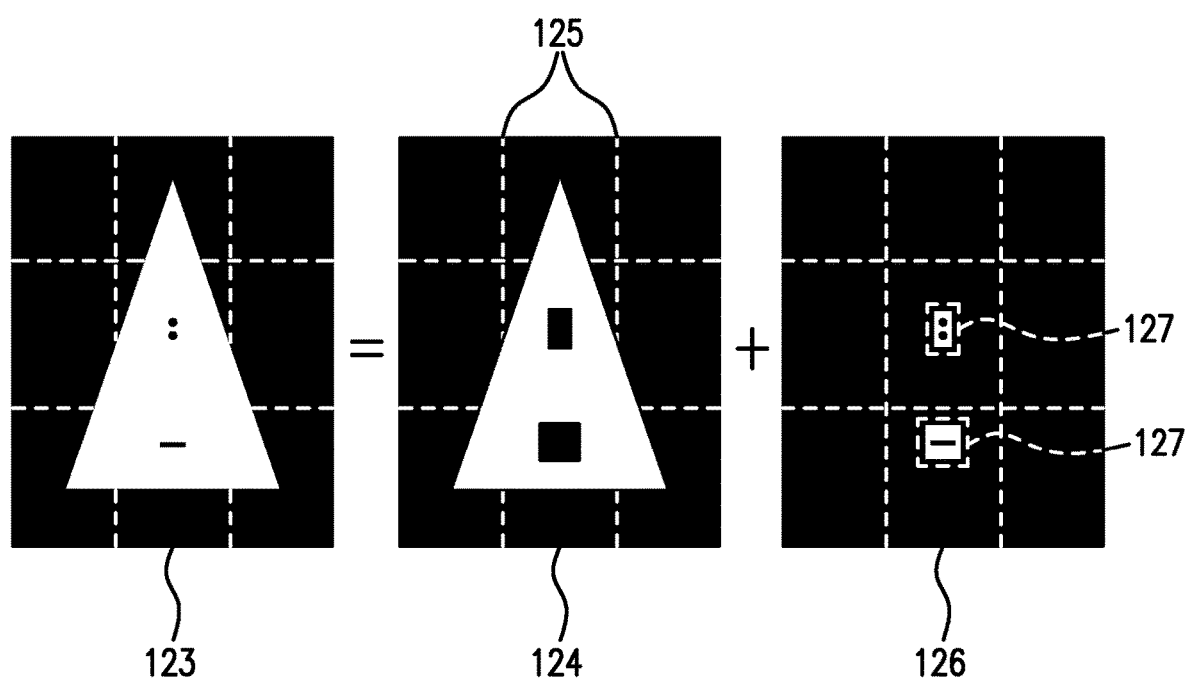
FIG. 4 shows the printing sequence in a multi-scale micro stereolithography system.

2A. The dashed lines 119 represent printing borders, and the single exposure is shown in the upper left corner of the available printing area 120. If multiple identical samples are needed, the XY states will move stepwise and print the same sample in an array 122. This is called array exposure mode, which is shown in FIG. 3C. Array exposure mode is much faster for small volume production than repeating the single exposure mode. As the sample size increases to exceed the size of the single exposure or the sample needs multi-scale printing, the system will further divide one layer into multiple sections and stitch the adjacent sections into a whole layer 121 by overlapping 5-30 µm on the shared edges. This is the stitching exposure mode, which is shown in FIG. 3B. It is possible to combine the stitching mode with array mode when one needs multiple identical samples but needs stitching exposure as the sample is larger than single exposure. However, this case is usually treated as stitching exposure mode. Especially in the multi-scale printing (FIG. 4), the layer image is analyzed as shown in step 123 and the small features ((gaps, holes, steps, sharps, etc.) are detected as shown in step 124 and isolated by windows 127 of the 2 µm single exposure as shown in step 126. For each layer, the printer first scans and prints using 10 µm exposures, then it alternates the shutter, reverses the scan and prints the isolated small features using 2 µm exposures. The projection images of the small features have 5-30 µm overlaps with the surrounding 10 µm images or 2 µm images all around. The overlaps happen not only among 10 µm images or 2 µm images, also happen between 10 µm and 2 µm images.

A high-resolution lens typically has a very small focal depth, for example the focal depth of the 2 µm lens is less than 10 µm. In printing, as the lens scans over the membrane, it is critical that the optical axis of both lenses are perpendicular to the membrane, such that the projected image will not be out of focus during the XY stage translation which may impair the printing resolution. Hence, as shown in FIG. 5, a high accuracy laser displacement sensor 128 (similar to laser displacement sensor 106 in FIG. 1) with resolution of 1 µm may be integrated with the dual lens 129 (similar to dual lens 105A, 105B of FIG. 1). The displacement sensor 128 serves two purposes. One purpose is to align one surface parallel to another, such as the membrane surface and the printing substrate surface. The other purpose is to precisely define the gap between two parallel surfaces by placing the surfaces in a position determined based on measurements taken by the laser displacement sensor 128.

The methods herein may be used as part of multi-scale PµSL printing process to establish a resin free surface, membrane, or hard window as parallel to the surface of a sample stage. As shown in FIG. 5 for a multi-scale PµSL printing system, three non-linear points, here forming the right-angle triangle as shown, are selected on the sample stage surface 130 and sequentially aligned with the displacement sensor 128 emission vector by moving the XY stages. The minimum distances between the points may be approximately 1 cm to guarantee good accuracy. The sample stage should be adjusted to make sure the distance readings between the displacement sensor and each point are the same. As the emission vector of the displacement sensor 128 is parallel to the optical axis of the lens 129, proper controls of the system will provide a stages surface perpendicular to the emission vector of the displacement sensor 128 and the optical axis of the lens 129. And it follows the same procedure to level the membrane such that the optical axis of the lens 129 is perpendicular to the membrane.

The invention claimed is:
1. A method for 3D printing, the method comprising:
generating, on a computer, a 3D digital model of a sample to be printed, slicing the 3D digital model into a sequence of images, wherein each image of the sequence of images represents a layer of the 3D digital model, and transferring a first image from the sequence of images from the computer to a micro display chip of an optical light engine comprising the micro display chip and a light source;
projecting the first image along with light from the optical light engine through a projection lens of a multi-projection lens complex onto a printing material; and
causing the printing material in bright areas of the first image as projected to be polymerized while dark areas of the first image as projected to remain liquid; wherein the optical light engine comprises the micro display chip and the light source; and
the multi-projection lens complex comprises two or more projection lenses with different imaging ratios, wherein the first image and the light are projected through only one projection lens at a time.

2. The method according to claim 1 wherein the multi-projection lens complex is a dual-projection lens comprising two projection lenses with different imaging ratios, including a first projection lens having a higher resolution and a second projection lens having a lower resolution, wherein both projection lenses share a same focal plane.

3. The method according to claim 2 wherein optical shutters in front of the two projection lenses are used to switch image projection from the first projection lens to the second projection lens.

4. The method according to claim 2 wherein the first projection lens has a resolution of 2 µm and the second projection lens has a resolution of 10 µm.

5. The method according to claim 1 further comprising:
preparing the printing material to be polymerized by at least one of: membrane coating, free surface coating, spray coating, or hard window coating.

6. The method according to claim 1 wherein the micro display chip comprises a liquid crystal display or digital light processing panel.

7. The method according to claim 1 wherein each image of the sequence of images represents a 5 to 20 µm layer of the 3D digital model.

8. The method according to claim 1 wherein a membrane that is optically clear is positioned between the printing material and the multi-projection lens complex, wherein the membrane has a bottom surface on a side away from the multi-projection lens complex, which bottom surface contacts the printing material during exposure, and wherein the first image and the light from the light source of the optical light engine is projected through one of the two or more projection lenses of the multi-projection lens complex, onto the bottom surface of the membrane to cure a first layer of the printing material, and after the first layer of the printing material is cured, a substrate for holding the sample is moved away from the membrane thus separating the membrane from the sample, after which the sample is moved back toward the membrane and positioned at a distance away from the membrane equal to a thickness of a second layer of the printing material to be printed, during which positioning the membrane is flattened to define the second layer of printing material.

9. The method according to claim 3 further comprising analyzing the first image of a layer of the printing material to be printed to detect small features which are isolated by windows corresponding to the higher resolution, scanning and printing the layer of the printing material using the second projection lens, followed by alternating between the optical shutters, scanning in reverse and printing the small features, which were isolated, using the first projection lens.

10. The method according to claim 1 wherein the first image has a size exceeding a size of a single image exposure, the method further comprises: dividing the first image into multiple sections, and printing the sections so that shared edges of adjacent sections overlap by 5 µm to 30 µm and stitching the sections into a whole layer of the printing material.

11. The method according to claim 1 wherein motion in X, Y, and Z directions of a substrate for supporting a printing sample and-/-or of the multi-projection lens complex is controlled by three precision stages.

12. The method according to claim 11, wherein the first image has a size exceeding a size of a single image exposure, the method further comprises:
   the substrate holding the printing sample is translated in an XY plane while the micro display chip and lens are fixed; and
   translating the micro display chip and lens and holding the substrate fixed, or translating both the substrate and the micro display chip and lens.

13. The method according to claim 1 wherein the multi-projection lens complex is positioned between the optical light engine and a surface of a substrate for holding a sample, the optical light engine being part of a projection printing system, which system further comprises:
   a vat holding printing material, wherein the substrate is disposed in the vat while the printing material is polymerized;
   a high precision camera that monitors a printing surface; and
   a laser displacement sensor integrated with the multi-projection lens complex, wherein the laser displacement sensor has an emission vector that is parallel to an optical axis of each projection lens, and which sensor is used to maintain a perpendicular relationship between the optical axis of each projection lens and the printing surface, wherein the printing surface is at least one of: a free printing surface, a membrane covered printing surface, or a hard window covered printing surface.

14. The method according to claim 13 wherein the laser displacement sensor is also used to precisely define a gap between two parallel surfaces of the projection printing system by positioning the parallel surfaces according to measurements of the laser displacement sensor.

15. The method according to claim 14 wherein the parallel surfaces comprise a membrane and the printing material.

16. The method according to claim 10 wherein least square fitting error curves based on measured data from printing samples are used to control motion of a substrate for supporting a printing sample and-/-or of the multi-projection lens complex in X and Y directions to compensate for mechanical tolerances of XY stages to ensure accuracy of stitching-printing is within desired specifications.

17. The method according to claim 13 wherein the method is repeated for each layer of the 3D digital model until an entirety of the 3D digital model is replicated from the printing material in the vat.

18. The method according to claim 1, wherein the printing material is a photo-curable resin.

* * * * *